Patented June 6, 1944

2,350,425

UNITED STATES PATENT OFFICE 2,350,425

MATERIALS HANDLING SYSTEM

George A. Spalding and Marley A. Palmer, Flint, Mich., assignors to General Motors Corporation, Detroit, Mich., a corporation of Delaware Application March 2, 1942, Serial No. 433,022

9 Claims. (Cl. 78—99)

This invention relates to metal processing apparatus, specifically to the materials handling mechanism operating to supply a forming machine with work pieces.

It is the object of this invention to provide apparatus for efficiently handling the stock fed to a forming machine without the intervention of human beings. Specifically, it is apparatus which automatically feeds cut rod stock to a furnace where the stock is heated for a predetermined length of time and thence to a press having a number of forming dies which give the rod stock its finished form, in this case an internal combustion engine valve. The particular apparatus comprises an endless belt conveyor to which cut rod stock is fed from a hopper. The conveyor transports the cut stock to a distributor which is located at an elevated position to permit gravity feed of the cut stock to the remaining work stations. In the distributor the work pieces or cut stock are stacked above a plurality of rollers which are driven together so as to take work pieces from the stacks in a predetermined sequence and drop them through a chute to a furnace comprising a battery of heaters. From the furnace the heated stock is fed through a chute to the die of the press.

Figure 1:
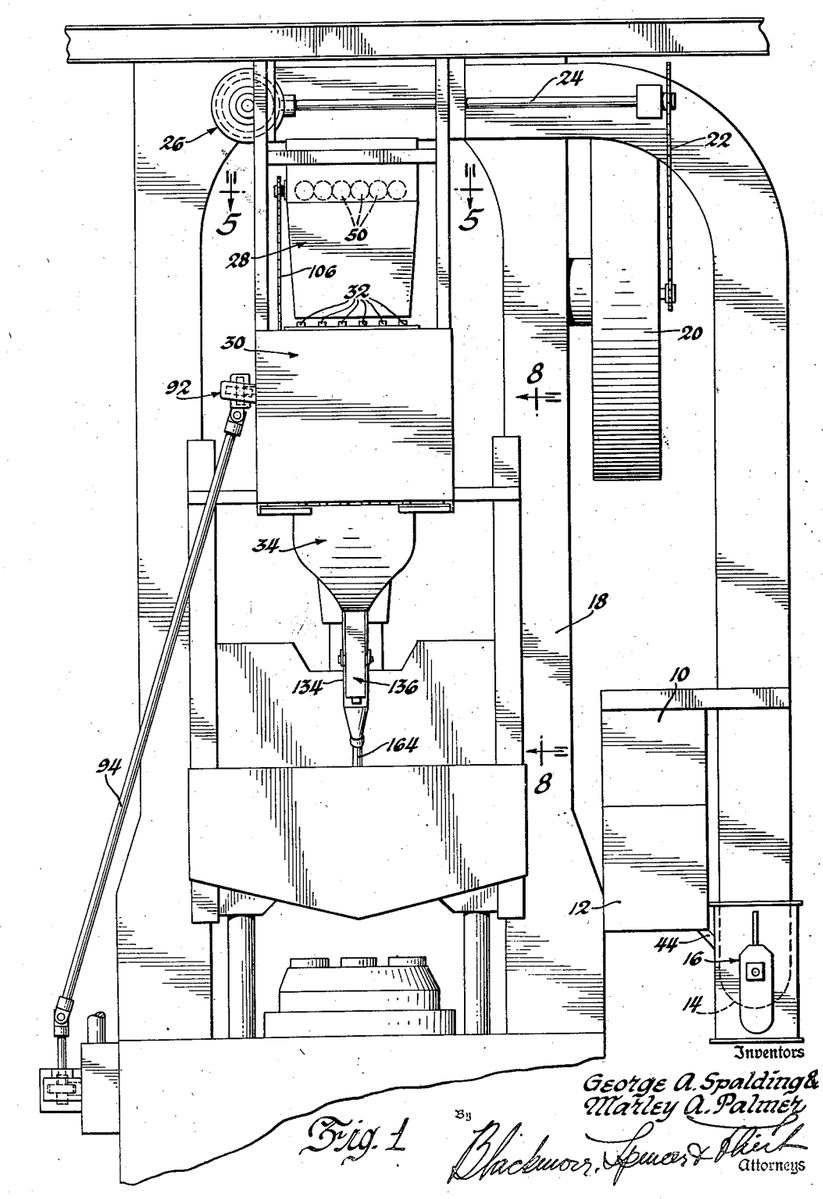
Figure 1 of the drawings shows the apparatus in elevation.

Referring now to Figure 1, 10 indicates diagrammatically any suitable cutter for cutting the rod stock into the desired lengths. The rod stock may be furnished in coil form or in any other satisfactory manner. A roller or grinder of some sort, not shown, may if desired be provided to remove burrs formed by the cutter. A loading device 12 is shown which may be a hopper adapted to receive the work pieces from the cutter and to transmit them by gravity feed to a conveyor 14. Conveyor 14 is conveniently made in the form of an endless belt. Any suitable take-up or tightening device indicated generally by 16 may be provided to keep the conveyor belt at the desired tension. The conveyor may conveniently be driven by press 18 from bull wheel 20 through chain-and-sprocket drive 22, shaft 24 and bevel gear drive 26.

Conveyor 14 delivers the work pieces to a distributor indicated generally by 28 in which the work pieces are stacked and fed to a furnace 30 comprising a battery of individual heaters 32. From the furnace the heated work pieces are gravity fed through chute 34 to press 18.

The details of the press are not given here. The press may be the same as or similar to the one disclosed and claimed in the copending application S. N. 367,534, of Lloyd Blackmore and Marx C. Kristek, filed November 28, 1940 and assigned to the assignee of the present invention.

Figure 2:
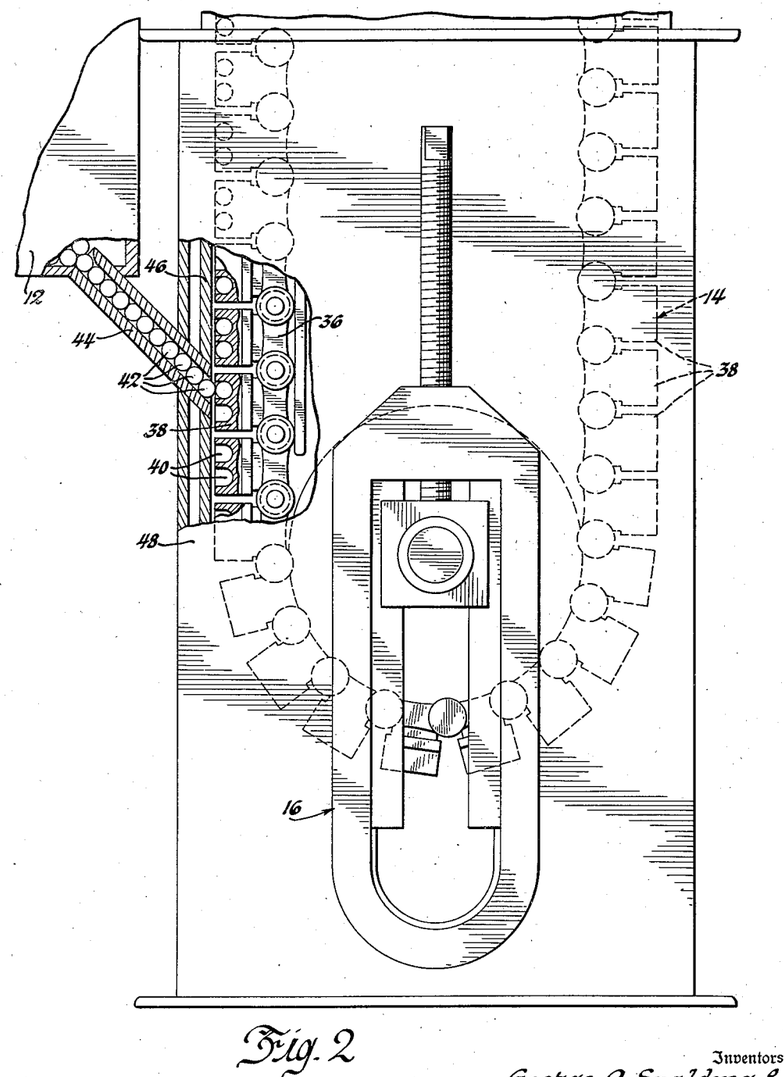
Figure 2 is an enlarged detail view, with parts broken away and in section, of the conveyor at the supply station or place where the work pieces are fed to the conveyor from the supply hopper.

Referring now to Figure 2, conveyor 14 is seen to comprise an endless chain of links 36 each of which has a projection or extension 38 in which may be one or more recesses 40 adapted to receive work pieces 42. Work pieces 42 are supplied to the conveyor from hopper 12 by gravity feed, as clearly shown in Figure 2, through a chute 44. Chute 44 is preferably made to contain a single row of work pieces. As an empty recess 40 arrives opposite the lower end of chute 44, a work piece 42 drops by gravity into the recess. A wall 46 is disposed in conveyor housing 48 close to extensions 38 to form a closure for the material receiving recesses 40. It will be understood that wall 46 extends the length of travel of conveyor 14 for so far as is necessary to retain work pieces in the recesses.

Figure 3:
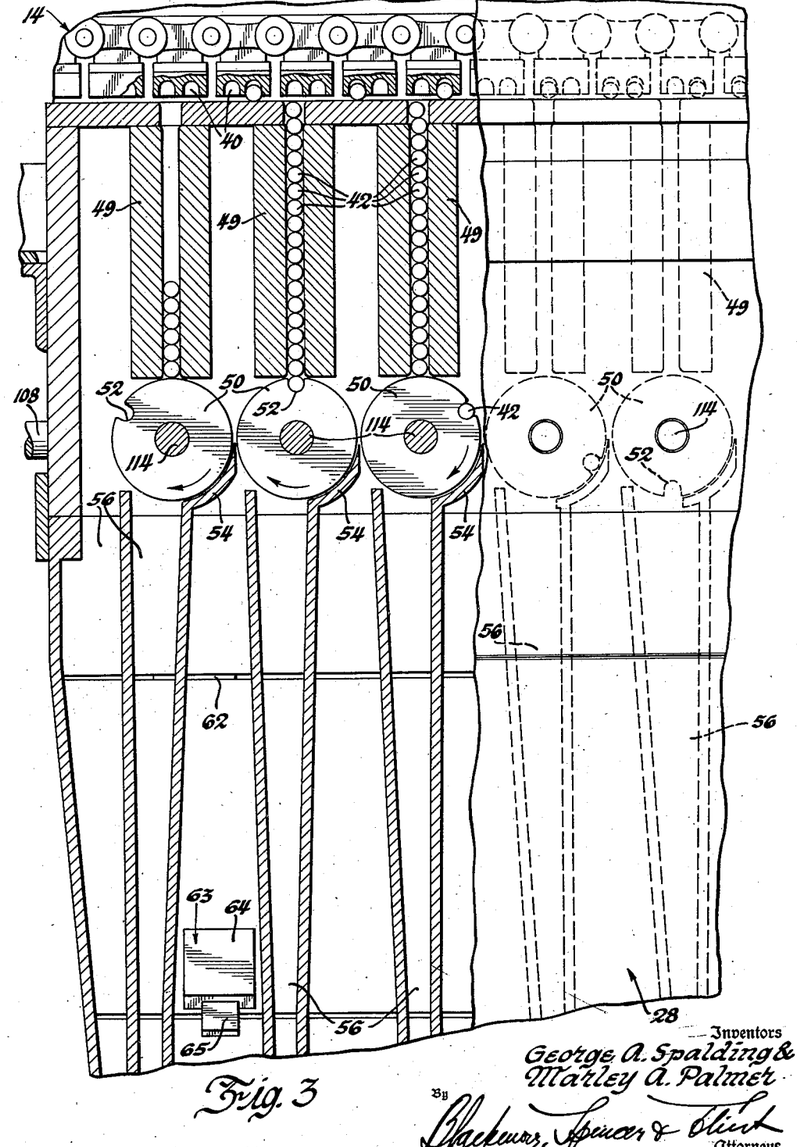
Figure 3 is an enlarged detail view with parts broken away and in section showing the construction of the distributor.

As can be seen in detail in Figure 3, distributor 28 is positioned to receive work pieces from the discharging end of conveyor 14. A plurality of stacking means 49 are provided for receiving work pieces 42 from the conveyor and arranging them in vertical stacks of single rows above a plurality of rolls 50. These rolls are provided with recesses 52 adapted to receive work pieces as the rolls are rotated to bring their respective recesses in alignment with the corresponding stacks of work pieces. As seen in Figure 3, rolls 50 rotate clockwise. A retainer 54 having the general contour of its cooperating roll is provided to keep work pieces 42 from falling out of recess 52 until the recess has reached a predetermined position. This position is shown as being the lowermost point of recess 52, 180° from the position in which recess 52 receives a work piece, but it will be understood that any other convenient position could be used. As can be seen in the drawing, recesses 52 are so arranged as to occupy angular positions 60° apart, from roll to roll. The rolls are driven synchronously, i. e., geared so as to be driven together. There are six of these rolls so that a work piece is discharged for every 60 degrees angular displacement of any given roll.

A chute 56 is disposed below each roll in position to receive pieces as they are discharged from the recesses in the rolls. As better seen in Figure 4, a turning device 58 is provided in each of chutes 56 to cause work pieces 42 to change from the horizontal position occupied in recess 52 to a vertical position for subsequent feeding to the furnace. In the illustration, the turning device takes the form of a piece of sheet material generally inverted L-shaped in cross section which extends into the space in chute 56 in such a manner as to contact one end of work piece 42 as the work piece drops into the chute. The turning device could be any other satisfactory means such, for example, as a rod extending across the chute in position to be struck by one end of work piece 42, or any other suitable stop or projection could be provided. Access to the space in chutes 56 may be had through a door 60 hinged as at 62 and provided with any satisfactory latch means 63 comprising a guide block 64, a keeper 65 and a handle 66. See Figure 3.

Figure 4:
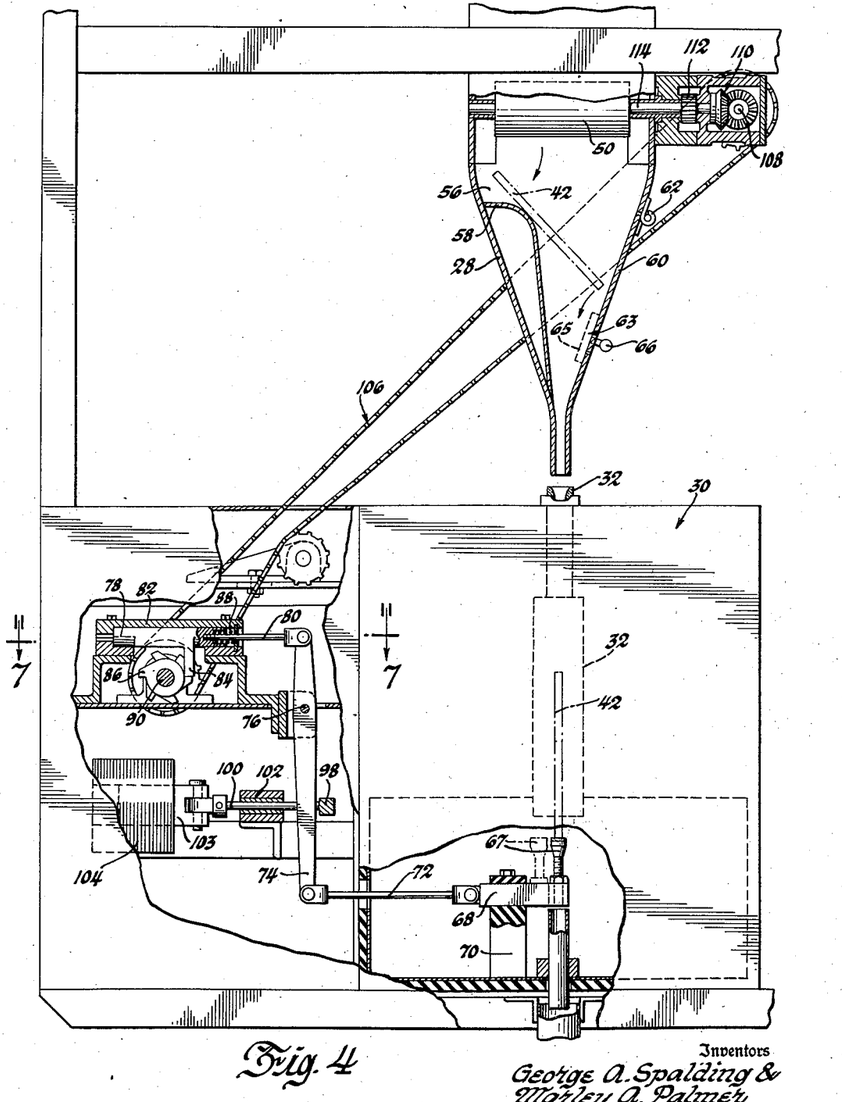
Figure 4 is an enlarged view, partially in section, showing details of the distributor and timer for releasing heated work pieces from the furnace.

The details of the heater units of furnace 30 are not set forth here. This furnace is substantially the same as the one disclosed and claimed in the copending application S. N. 401,888 of Harold F. Howard and William Richards, filed July 11, 1941, and assigned to the assignee of the present invention. Briefly, however, the furnace comprises six heater units 32. Heaters 32 are positioned to receive work pieces from the chutes 56 to which the pieces are fed from rollers 50. Below each heater unit there is disposed a stop 67 mounted on a reciprocable arm 68 which slides in support 70. A link 72 connects arm 68 with a lever 74 which is pivoted at 76. An operating member 78 is connected to a lever 74 through link 80. Member 78 is reciprocably mounted in a housing 82 and is provided with a downwardly extending member 84 serving as a cam follower, positioned to be engaged by a cam 86 in order to move member 78 to the right as seen in Figure 4, rotating lever 74 clockwise to withdraw stop 67 to the dotted line position of Figure 4, out of work holding position. A spring 88 may be provided in housing 82 to bias member 78 and stop 67 and their associating linkages into position for holding work piece 42 in the heater. The linkage from stop 67 to and including operating member 78 is the same for the five other heater units of the furnace. Cam 86 is but one of six similar cams mounted on shaft 90 to rotate together. The lobes are arranged sixty angular degrees apart from one cam to the next. Shaft 90 is driven clockwise, as seen in Figure 4, through a helical gear drive 92 which receives power from press 18 through shaft 94. See Figure 1. Drive 92 could be any other type of connection, such as bevel gears or a worm and gear.

Additional means for tripping stop members 67 out of work holding position may be provided in the form of a lost-motion connection comprising a bar 98. Bar 98 extends across all of members 74 and is connected to and held in place by one or more links 100 reciprocably mounted in any suitable support 102. Movable core 103 of solenoid 104 may be connected to reciprocate links 100. The purpose of solenoid-operated trip 98 is to enable "dumping" of all stops 67 simultaneously whenever desired, such as when the machine is shut down. For this purpose, solenoid 104 may be so arranged as to be momentarily energized upon the interruption of power to the press, permitting the emptying of all of heater units 32 of work pieces so that no piece will remain in the furnace long enough for that piece to be melted. Alternatively, the system could be so arranged that solenoid 104 would be continuously energized during operation of the press with bar 98 moved out of dumping position during such operation. In this case, a spring, not shown, could be applied to move bar 98 and its associated linkage into the dumping position upon shutting down of the press.

Figure 5:
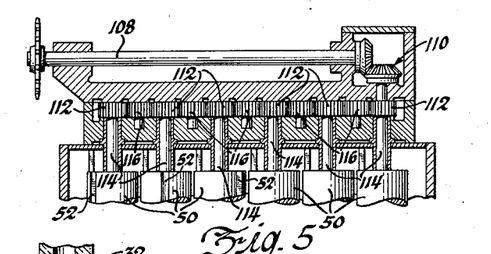
Figure 5 is a view in section substantially on line 5—5 of Figure 1.

Shown in Figures 4 and 5 is the sprocket-and-chain drive 106 which supplies power from camshaft 90 to the rolls 50 through the said chain-and-sprocket drive, a shaft 108 and a bevel gear connection 110. As is best see in Figure 5, each of rolls 50 is connected to a drive gear 112 through a shaft 114. Between pairs of adjacent gears 112 are disposed idler gears 116 which transmit the drive from the gear 112 on the extreme right as seen in Figure 5 to the remaining rolls, and which result in rolls 50 all being driven in the same direction.

Figure 6:
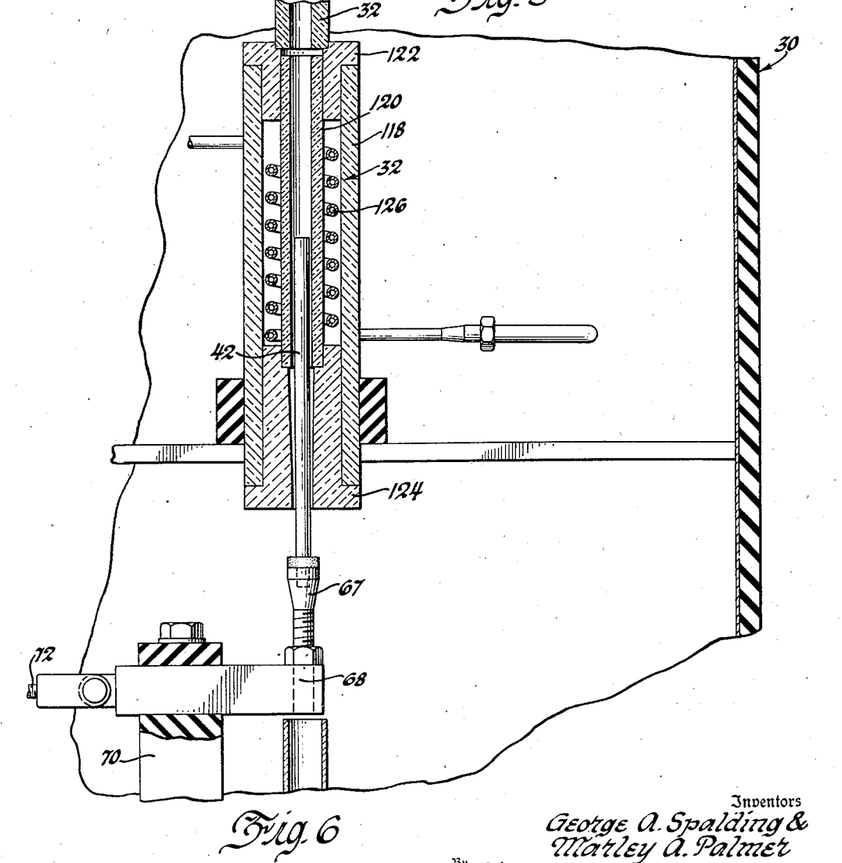
Figure 6 is a view with parts broken away and in section showing enlarged details of a heater unit of the furnace, and the stop mechanism for holding work pieces in the heater.

As seen in Figure 6, heater unit 32 comprises a jacket 118 of insulation material, lined with a sleeve 120, having bushings or end pieces 122 and 124 which serve as spacers or locaters of sleeve 120 with respect to jacket 118. Members 118, 120, 122 and 124 will preferably be made of an insulating material such as any suitable refractory or ceramic material. In the annular space between jacket 118 and sleeve 120 may be disposed an electrical heating coil 126. As stated above, the method of heating unit 32 is described in detail and claimed in copending application S. N. 401,888, filed July 11, 1941.

Figure 7:
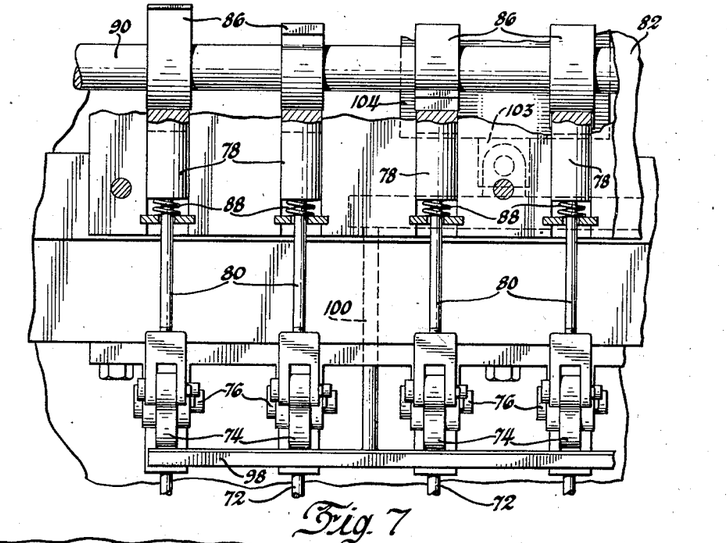
Figure 7 is a view in section substantially on line 7—7 of Figure 4.

Figure 7 is a section substantially on line 7—7 of Figure 4 showing in detail a portion of camshaft 90 with four of the six cams 86 and the linkage associated with operating members 78 for the actuation of stops 67. Shown also in this figure is solenoid 104 and its associated mechanism for the dumping of all of the stops simultaneously.

Figure 8:
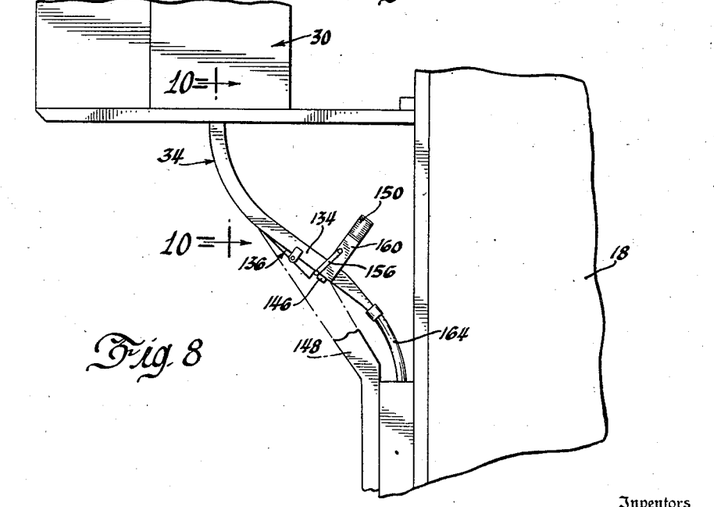
Figure 8 is a view in section substantially on line 8—8 of Figure 1.
Figures 9, 10:
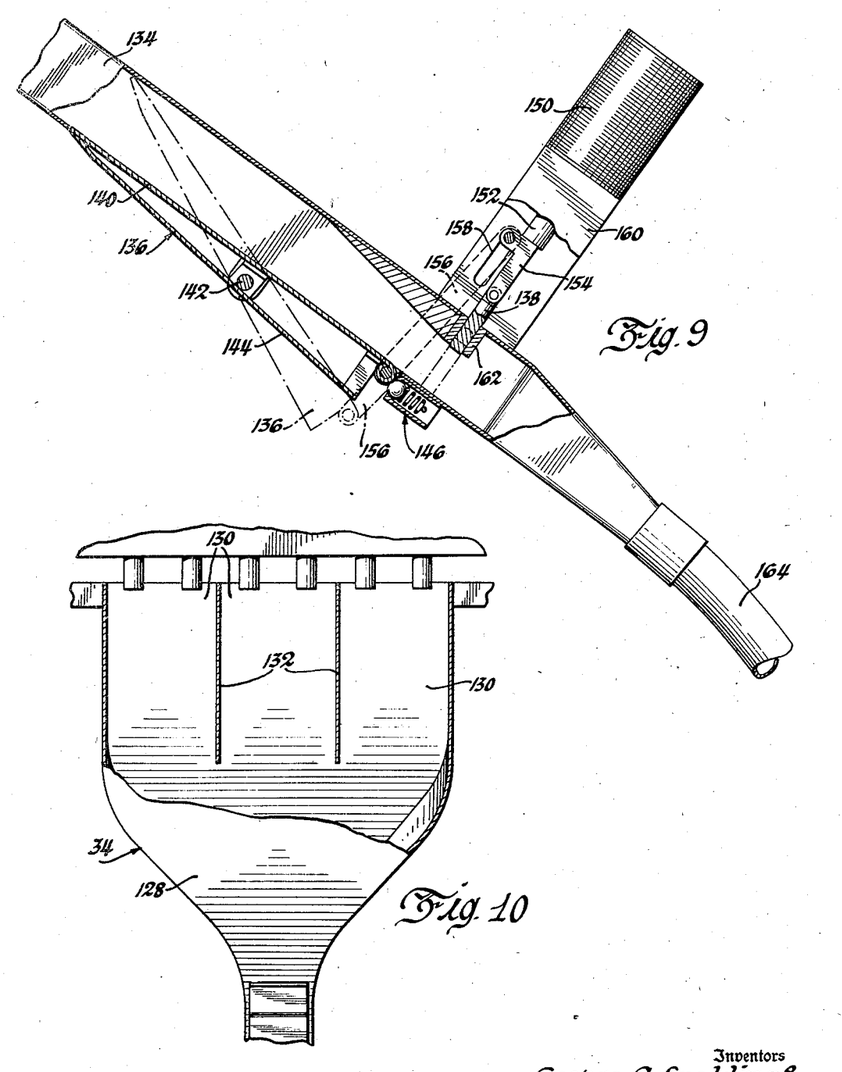
Figure 9 is an enlarged detail view of a portion of the chute which conducts work pieces from the furnace to the forming machine. Specifically, this figure shows the gate mechanism for blocking the passage of work pieces to the machine.
Figure 10 is a view in section substantially on line 10—10 of Figure 8.

Figures 8, 9 and 10 show details of the chute which conducts work pieces from the heater to the press. As best seen in Figure 10, at the upper part of chute 34 is a tapering member 128 which is divided into compartments 130 by partitions 132 at its wide portion to keep the falling work pieces from turning sidewise and sticking in the tapering portion. Following the tapered portion of member 128 there is a comparatively narrow channel 134 in which is disposed means for intercepting work pieces to prevent their being conducted to the dies of the press. These intercepting means comprise gates 136 and 138. As can be readily seen in Figure 9, gate 136 is a panel 140 in the lower wall of channel 134 pivoted about an axis 142. An apron or deflector sheet 144 may be provided on the outside of pin 142 to avoid the possibility of interference with the descending work pieces by hinge member 142. Any suitable latch means such as the spring-biased ball assembly 146 may be used to hold gate 136 in its closed position. If desired, a handle, not shown, may be attached to gate 136 to permit manual operation thereof. An auxiliary chute shown in dotted lines at 148 in Figure 8 may be provided to conduct the intercepted work pieces to some suitable delivery point, such as to the floor somewhere near the press. A convenient use for gate 136 and chute 148 is to run the heated work pieces out for inspection before they are fed to the die to make sure that they are being heated properly.

For the automatic operation of gate 136 a solenoid 150 may be provided. The operating plunger or core 152 of solenoid 150 may be connected to gate actuating member 154 which may operate gate 136 through a link 156. A guide for member 154 may be provided in the form of a slot 158 formed in housing 160. The pin connecting members 154 and 156 may be extended somewhat so as to operate in slot 158.

In addition to gate 136, gate 138 is provided as a positive stop across the channel of member 134. Gate 138 does not provide for any new path to be taken by the work pieces as does gate 136 but merely keeps them from passing beyond to the press. Gate 138 is adapted to reciprocate in guide member 162. This gate also may be actuated by solenoid 150 through plunger 152 and actuating member 154.

It will be understood by those skilled in the art that solenoid 150 may be energized in any of a number of ways for satisfactory operation of gates 136 and 138. For example, solenoid 150 may be so connected with the controls of the press as to be energized while the press is in operation and in its energized position to hold gates 136 and 138 open to permit the passage of work pieces to tube 164 and thence to the dies of the press. In that case, a spring, not shown, could be provided to operate gates 136 and 138 into their intercepting positions upon shutting down of press 18. However, we prefer to connect solenoid 150 in such a manner as to energize it for moving gates 136 and 138 into work piece intercepting position upon shutting down of the press. A spring, not shown, may for this connection be provided to move plunger 152 to gate open position when the solenoid is not energized.

The operation of the apparatus is as follows: Work pieces 42 in the form of cut rod stock are fed from hopper 12 through chute 44 to conveyor 14 where they are received in recesses 40 and are carried up to their point of distribution immediately above distributor 28. In distributor 28 are disposed stacking means 49 into which work pieces 42 fall from recesses 40 of conveyor 14. Disposed below each stacking means 49 is a roll 50 having a material receiving recess 52. As recess 52 of roll 50 comes into alignment with the stack of work pieces 42, a single piece drops into the recess and is carried around by rotation of roll 50. Retainer 54 keeps work piece 42 in recess 52 until roll 50 has rotated recess 52 into a predetermined angular position. Work piece 42 thereupon drops out of recess 52 into chute 56. One end of work piece 42 contacts any suitable stop member 58 to turn work piece 42 into a substantially vertical position, in which position work piece 42 drops down into heater unit 32 of furnace 30. Stop member 67 keeps work piece 42 from dropping straight through heater unit 32. After a predetermined time interval, permitting heating of work piece 42 to the desired temperature, cam 86 engages downwardly extending member 84 of operating member 78 which moves stop 67 out of work piece holding position through the above described linkage. The heated work piece 42 thereupon drops down into chute 34 and is conducted to the dies of press 18. It has been pointed out that conveyor 14 is positively driven from press 18. Likewise, camshaft 90 which serves as the timer for stops 67 is positively driven from press 18 and distributor 28 is driven through a chain-and-sprocket connection to camshaft 90. It is seen then that all moving parts of the apparatus are operated in synchronism with the press. This has been found desirable for most successful operation. It may be pointed out here that we have obtained best operating results by so arranging conveyor 14 in relation to recesses 52 of rolls 50 that a work piece drops out of stacking means 49 into recess 52 at a time when there is no work piece directly opposite the upper end of the stack, and a work piece drops into stacking member 49 after recess 52 has rotated past the stack. In other words, best operation of the apparatus has been obtained by not taking work pieces from stacking means 49 at the same time that work pieces are fed to these means.

When the press is shut down, solenoid 104 is momentarily energized to move all of stops 67 substantially simultaneously into the dotted line position shown in Figure 4, "dumping" or releasing all of work pieces 42 from the furnace. At the same time, gates 136 and 138 are actuated as above described into work intercepting position to keep any insufficiently heated stock from passing to the press.

We claim:

1. In combination, an endless belt conveyor, means to supply cut stock to the conveyor, a distributor adapted to receive stock from the conveyor, a heater positioned to receive stock from the distributor by means of gravity, a stop engaging the stock to hold the same in position to be heated, stop retracting means, a chute positioned to receive stock from the heater when the stop is retracted, a metal working machine positioned to receive stock from the chute and means for actuating the conveyor, distributor, and stop retracting means in synchronism with the metal working machine.

2. In combination, an endless belt conveyor having a stock receiving station and a stock distributing station, means to supply elongated stock to the conveyor at the stock receiving station, a distributor at the stock distributing station adapted to receive the stock pieces, a heater positioned to receive stock from the distributor by means of gravity, a stop engaging the stock to hold the same in position to be heated, stop retracting means, a metal working machine, means including an inclined chute for transmitting heated stock from the heater to the metal working machine and means for actuating the conveyor, distributor, and stop retracting means in synchronism with the metal working machine.

3. In apparatus of the class described, an endless metal belt conveyor, means to supply elongated rod stock to the conveyor, stacking means to receive elongated rod stock from the conveyor and stack the stock pieces one above the other with the longitudinal axes of the stock pieces in horizontal position, a first chute, a heater disposed below the first chute, an elongated roller having a longitudinally extending recess in the surface thereof to receive the lowermost elongated stock piece from the stacking means and move said stock piece to a position where the stock piece may be discharged by means of gravity into the said first chute, means in the first chute to turn the stock piece through 90°, said first chute directing by means of gravity the stock piece endwise into the heater, stop means engaging the forward end of the stock piece and holding the stock piece in position to be heated, means for withdrawing the stop member when the stock piece has been heated, a second chute to receive by means of gravity the heated stock piece when the stop is withdrawn, and a work forming machine for normally receiving a heated stock piece by means of the second chute.

4. An apparatus as in claim 3 which includes a means in the second chute to prevent stock pieces from being fed to the forming machine upon interruption of the power supply to the forming machine.

5. An apparatus as in claim 3 which includes a gate swingably mounted in the second chute and actuable to a position to intercept a stock piece and direct it away from the forming machine, and a second gate actuable to block passage of a stock piece through the second chute.

6. In apparatus of the class described, a roll having recesses adapted to receive elongated work pieces, means disposed above each roll to support a stack of work pieces the lowermost of which is in contact with the roll, means to rotate the roll to bring the recess into work piece receiving and releasing positions, a first chute below the roll to receive the work piece when released, a heating unit below said first chute, a movable stop below the heating unit to hold a work piece in position to be heated, means to move the stop out of work holding position, a machine for forming heated work pieces, and a second chute to feed heated work pieces to the forming machine when the stop is out of work holding position, said roller and stop moving means being actuated in synchronism with the forming machine.

7. An apparatus as in claim 6, which includes a gate in the second chute actuable to intercept work pieces to prevent them going to the forming machine.

8. An apparatus as in claim 6, which includes a gate swingably mounted in the second chute and actuable to a position to intercept work pieces moving through the chute to direct them away from the forming machine, and a second gate actuable to block passage through the second chute to the forming machine.

9. An apparatus as in claim 6, which includes a gate in the second chute actuable to intercept work pieces to prevent them going to the forming machine and an electrical means to actuate the gate.

GEORGE A. SPALDING.
MARLEY A. PALMER.